United States Patent [19]

Ohkubo et al.

[11] 4,400,890
[45] Aug. 30, 1983

[54] LENGTH MEASURING DEVICE

[75] Inventors: Hiroyuki Ohkubo, Chiba; Hiroshi Maru, Oomiya; Yoshito Kato, Aichi; Toshio Hashimoto, Toyota, all of Japan

[73] Assignee: Sony Corporation, Tokyo, Japan

[21] Appl. No.: 314,775

[22] Filed: Oct. 26, 1981

[51] Int. Cl.³ .................... G01B 7/02; G06M 3/06
[52] U.S. Cl. ......................... 33/125 C; 33/143 L; 377/24
[58] Field of Search ............ 33/125 C, 125 R, 125 A, 33/143 L; 235/92 GC, 92 DN

[56] References Cited

U.S. PATENT DOCUMENTS

| 2,918,666 | 12/1959 | Brower et al. | 33/125 C |
| 4,028,603 | 6/1977 | Selam | 318/587 |
| 4,229,647 | 10/1980 | Burkhardt | 235/92 GC |

FOREIGN PATENT DOCUMENTS

| 1116613 | 5/1956 | France | 33/125 C |
| 2030713 | 11/1970 | France | G08C/900 |
| 184154 | 7/1954 | Sweden | 33/125 C |
| 1302762 | 1/1973 | United Kingdom | G01B/700 |
| 2022843 | 12/1979 | United Kingdom | 33/125 C |

*Primary Examiner*—Willis Little
*Attorney, Agent, or Firm*—Lewis H. Eslinger; Alvin Sinderbrand

[57] ABSTRACT

A length measuring device has a magnetic scale body including at least one origin signal magnetic section and a measurement signal magnetic section forming a magnetic grating, the magnetic scale body having a uniform frictional surface formed over the entire effective length of the scale body, and a detecting head body including an origin detecting head for detecting an origin signal and a measurement detecting head for detecting a measurement signal and provided with a scraper in elastic contact with the frictional surface of the magnetic scale body, the detecting head body moving relative to the magnetic scale of the body along the length of the latter.

7 Claims, 6 Drawing Figures

LENGTH MEASURING DEVICE

BACKGROUND OF THE INVENTION

1. Field of the Invention

This invention relates to length measuring devices and more particularly, to length measuring devices in which standard graduations of a planar magnetic scale formed in a magnetic grating are read by a detecting head.

2. Description of the Prior Art

Length measuring systems using a magnetic scale formed on a magnetic grating are generally based upon an incremental counting system, in which pulse signals for each unit displacement of a detecting head relative to a magnetic scale are counted to derive a mesurement value. A length measuring system based upon such an incremental counting system is simple in construction and relatively inexpensive to manufacture. However, previously calculated positional information is entirely lost in such systems with a loss of power. In addition, iron and other particles are likely to accumulate on the surface of the magnetic scale. If these particles are caught between the magnetic scale and the detecting head when it moves, they can damage the detecting head and the magnetic scale.

OBJECTS AND SUMMARY OF THE INVENTION

It is an object of the present invention is to provide a length measuring system which measures absolute distances from an origin or start point using a magnetic grating.

It is another object of the present invention to provide a length measuring device which uses a plane magnetic scale and which is resistant to degradation by the environment.

It is still a further object of the present invention to provide a length measuring device which cleans away iron particles and other particles deposited on the surface of a magnetic scale read by a detecting head.

In accord with the present invention, a length measuring device has a magnetic scale body including at least one origin signal magnetic section and a measurement signal magnetic section forming a magnetic grating, the magnetic scale body having a uniform frictional surface formed over the entire effective length of the scale body, and a detecting head body including an origin detecting head for detecting an origin signal and a measurement detecting head for detecting a measurement signal and provided with a scraper in elastic contact with the frictional surface of the magnetic scale body, the detecting head body being moved relative to the magnetic scale body along the length of the latter.

The above, and other objects, features and advantages of the invention will be apparent from the following detailed description of illustrative embodiments thereof which is to be read in connection with the accompanying drawings.

DESCRIPTION OF THE PREFERRED EMBODIMENTS

Figure 1:
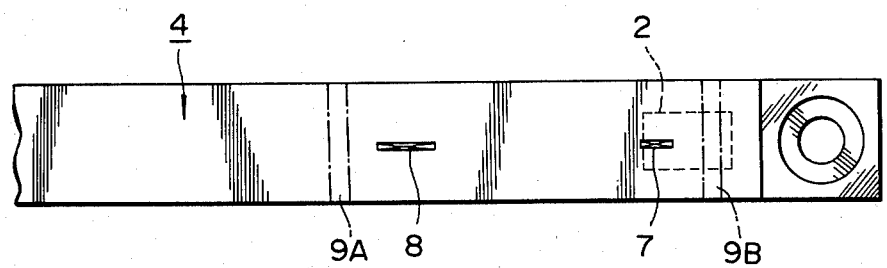
FIG. 1 is a schematic plan view of a length measuring device in accord with the present invention.
Figure 2:
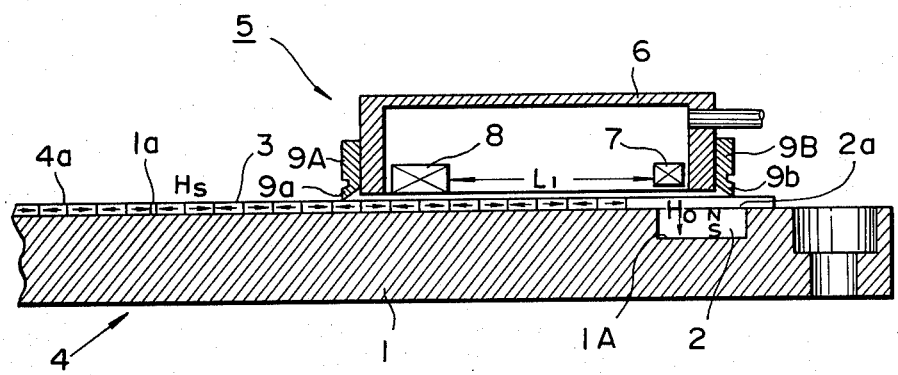
FIG. 2 is longitudinal sectional view of the length measuring device of FIG. 1.

FIGS. 1 and 2 show an embodiment of the present invention applied to a magnetic scale device in which a magnetic grating is formed by a transverse magnetic recording. A magnetic scale body 4 includes a scale base 1 having, an origin signal magnetic member 2 disposed in a recess 1A formed at one end thereof, and a measurement signal magnetic member 3 covering a surface 1a of scale base 1, including a top 2a of origin signal magnetic member 2.

Scale base 1 is made of a non-magnetic material. Origin signal magnetic member 2 can be a rare earth element magnet, a rubber magnet, a plastic magnet or the like and generates a magnetic field $H_O$ as an origin signal to indicate an origin or start point in a direction perpendicular to surface 1a. The Measurement signal magnetic member 3 can be a rolled magnet made of spinodal magnetic material such as Cu.Ni.Fe or Cu.-Ni.Co and is magnetized to supply a magnetic grating which generates a surface field measurement signal from a transverse magnetic recording parallel to a frictional planar surface 4a. The rolled magnet forming measurement signal magnetic member 3 has a magnetic permeability ranging from 1 to 3. Covering surface 2a of origin signal magnetic member 2 does not significantly affect the signal field therefrom. Accordingly, the magnetic grating of measurement signal magnetic member 3 can be formed to cover origin signal magnetic member 2.

A detecting head body 5, which is movable relative to magnetic scale body 4, includes a case 6 which houses an origin detecting head 7 and a measurement detecting head 8. Origin detecting head 7 and measurement detecting head 8 are spaced apart by a predetermined distance $L_1$. Scrapers 9A and 9B are mounted on opposite side walls 6a and 6b of case 6. The Scrapers 9A and 9B are made of an elastic material such as polyrethane or nitrile rubber. The Scrapers 9A and 9B have respective sharp edges 9a and 9b which are in elastic contact with a frictional surface 4a of measurement signal magnetic member 3. As detecting head body 5 moves with respect to magnetic scale body 4, scrapers 9A and 9B also move in frictional contact with frictional surface 4a of magnetic scale body 4 to remove iron particles deposited on frictional surface 4a. Origin detecting head 7 is a magnetic switch employing a ferromagnetic magnetic reluctance effect element or the like, and is secured in case 6 with a comparatively large clearance with respect to frictional surface 4a of magnetic scale body 4. Measurement detecting head 8 is a multigap magnetic head of a magnetic flux response type or a magnetic sensor also employing a ferromagnetic magnetic reluctance effect element. Measurement detecting head 8 is disposed in case 6 so that it moves in elastic contact with frictional surface 4a along with movements of detecting head body 5 over magnetic scale body 4.

The illustrated embodiment is very suitable as a high resolution length measurement device, in which the magnetic grating has a short wavelength of 2 mm or less and is formed by a lateral magnetic field recording in measurement signal magnetic member 3 of magnetic scale body 4. Magnetic field $H_O$ from origin signal magnetic member 2 can be detected as a signal indicative of an origin or start point by origin detecting head 7. Signal field $H_S$ from measurement signal magnetic member 3, i.e., the measurement position information detected by the measurement detecting head 3, can be used as a signal indicative of an absolute position with relation to a start or origin point indicated by origin signal magnetic member 2. In addition, frictional surface 4a of magnetic scale body 4 is always cleaned by scrapers 9A and 9B, so that the illustrated embodiment of a length measurement device can withstand heavy use even in an environment where iron particles are scattered.

Figure 3:
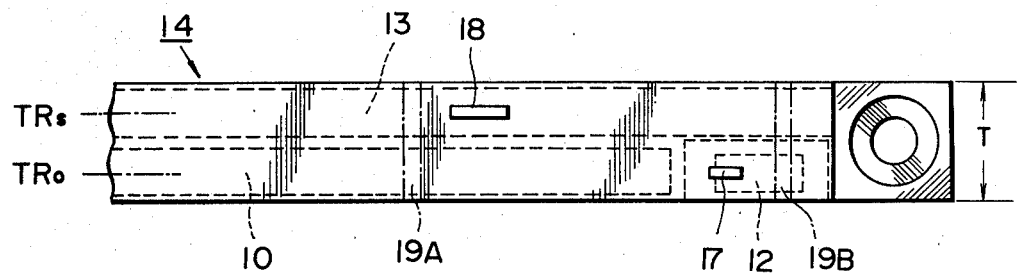
FIG. 3 is a schematic plan view of another embodiment of a length measuring device in accord with the present invention.
Figure 4:
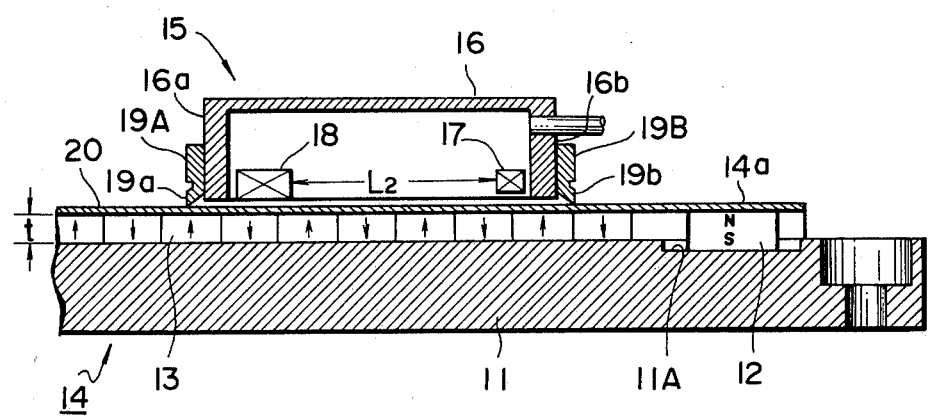
FIG. 4 is a longitudinal sectional view of the length measuring device of FIG. 3.

FIGS. 3 and 4 show another embodiment of the present invention in which the magnetic grating is formed by longitudinal magnetic recording. A magnetic scale body 14 includes a scale base 11, an origin signal magnetic member 12 and a measurement signal magnetic member 13 formed thereon, and a protective layer 20 made of a non-magnetic material formed over the entire top surface of magnetic members 12 and 13. In the illustrated embodiment, an origin track $TR_O$, in which origin signal magnetic member 12 is disposed, and a measurement track $TR_S$, in which measurement signal magnetic member 13 is disposed, are formed on magnetic scale body 14. A magnetic head body 15 includes an origin detecting head 17 and a measurement detecting head 18 for tracing tracks $TR_O$ and $TR_S$, respectively. Heads 17 and 18 are spaced apart a predetermined distance $L_2$ within body 15. Origin signal magnetic member 12 and measurement signal magnetic member 13 can be made of rubber magnet or barium ferrite which is readily available. Scale base 11 can be made of a magnetic material to reinforce signal field $H_S$ from measurement signal magnetic member 13. Further, in a portion of origin track $TR_O$ track away from origin signal magnetic member 12 a spacer 10 having substantially the same thickness t as measurement signal magnetic member 13 is interposed between scale base 11 and protective layer 20. In the illustrated embodiment, scale base 11 has a recess 11A to accommodate origin signal magnetic member 12. Spacer 10, comprising a magnetic plate, is used with measurement signal magnetic member 13 accurately to match thickness t of magnetic member 13 and spacer 10 so that the upper surface of protective layer 20 is smooth and level for detecting head body 15 to move thereover.

Detecting head body 15 with opposite side walls 16a and 16b of head 16 has scrapers 19A and 19B attached thereto with corresponding sharp edges 19a and 19b of width T extending across tracks $TR_O$ and $TR_S$.

In the embodiment discussed above, a magnetic grating, as, for example, a comparatively large wavelength of 1 mm or more is formed by a longitudinal magnetic recording in measurement signal magnetic member 13. Accordingly, a length measurement device having a comparatively low resolution is provided. With a comparatively large wavelength for the magnetic grating, a large clearance between measurement signal magnetic member 13 and measurement detecting head 18 may be employed. The thickness of protective layer 20 functioning as a non-magnetic sheet on the surface of magnetic scale body 14 can also be sufficiently accommodated with a comparatively large clearance.

In the embodiment of FIGS. 3 and 4, a frictional surface 14a of magnetic scale body 14 can be a smoothly finished planar surface so that scrapers 19A and 19B can effectively clean surface 14a. In addition, an absolute length measurement output on the basis of the information of the point of origin can be derived.

Figure 5:
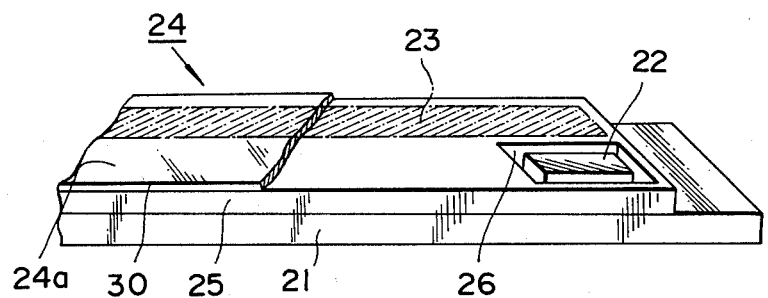
FIG. 5 is a partial, cutaway perspective view showing a modification of the magnetic scale body employed in the length measuring device according to the present invention.

Spacer 10 in the illustrated embodiment can be integrally formed on a common magnetic plate with measurement signal magnetic member 13. FIG. 5 shows a magnetic scale device utilizing a magnetic grating formed by the aforementioned longitudinal magnetic recording. The illustrated distance measuring device includes a scale base 21, a magnetic plate 25 made of barium ferrite, and a protective layer 30 made of a non-magnetic sheet of material. The magnetic grating formed by the longitudinal recording is selectively provided in a region of magnetic plate 25 corresponding to measurement track $TR_S$, thus forming measurement signal magnetic member 23. Plate 25 on scale base 21 is formed in a region corresponding to origin track $TR_O$ and has a recess 26 to receive origin signal magnetic member 22. A protective layer 30 covers the entire surface of magnetic plate 25 and origin signal magnetic member 30 and provides a smooth planar frictional surface 24a for magnetic scale body 24.

Figure 6:
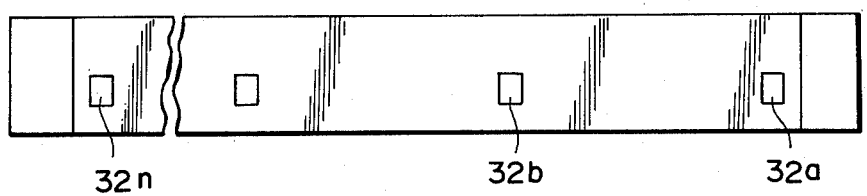
FIG. 6 is a schematic plan view showing a modification of the magnetic scale body according to the present invention.

While in the above described embodiments a single origin signal magnetic member is arranged on the scale base, it is also possible to have a plurality of origin signal magnetic members 32a, 32b . . . 32n in a magnetic scale body 32, as illustrated in the embodiment of FIG. 6. Multiple origin signal magnetic members 32a, 32b, . . . 32n provide information of respective predetermined positions to derive a length measurement output based upon the information from individual origin points 32a, 32b, . . . 32n.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

We claim:

1. A length measuring device comprising a magnetic scale body including at least one origin signal magnetic section and a measurement signal magnetic section forming a magnetic grating, said magnetic scale body having a uniform frictional surface formed over the entire effective length of said scale body, and a detecting head body including an origin detecting head for detecting an origin signal and a measurement detecting head for detecting a measurement signal and provided with scraper means in elastic contact with said frictional surface of said magnetic scale body, said detecting head body being moved relative to said magnetic scale body along said length of the latter.

2. A length measuring device according to claim 1, wherein said scale body has a scale base in which an origin signal magnetic member is buried to form said origin signal magnetic section, and one surface of said scale base including the top surface of said origin signal magnetic member is covered by a measuring signal magnetic member forming said measurement signal magnetic section.

3. A length measuring device according to claim 1, wherein said scale body include a scale base and an origin signal magnetic member and a measuring signal magnetic member are provided on said scale base to define said origin signal magnetic section and said measurement signal magnetic section, respectively and a protective layer consisting of a non-magnetic material is formed to entirely cover a surface of each of said magnetic members.

4. A length measuring device according to claim 3, in which said origin signal magnetic member and said measuring signal magnetic member are arranged side-by-side on said scale base.

5. A length measuring device according to claim 3, in which said origin signal magnetic member and said measuring signal magnetic member are arranged in succession in the direction of said length of the magnetic scale body.

6. A length measuring device according to claim 1, in which said origin signal magnetic section and said measurement signal magnetic section are arranged side-by-side on said scale body.

7. A length measuring device according to claim 1, in which said origin signal magnetic section and said measurement signal section are arranged in succession in the direction of the relative movement of said detecting head body and said scale body.

* * * * *